Apr. 17, 1923.
H. J. COOK
HANDLE ADJUSTING MECHANISM
Filed Feb. 21, 1922
1,452,192
2 Sheets-Sheet 1
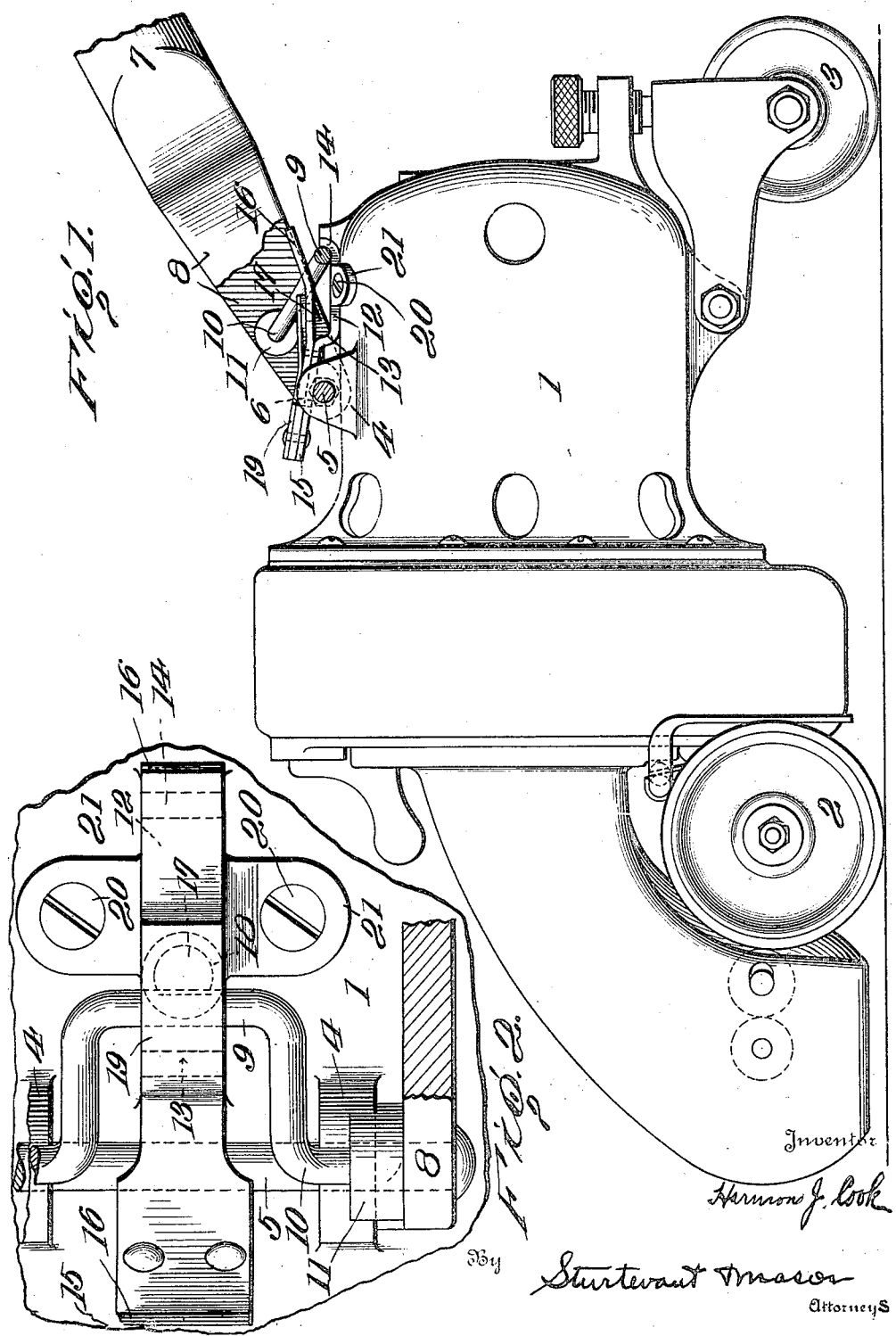

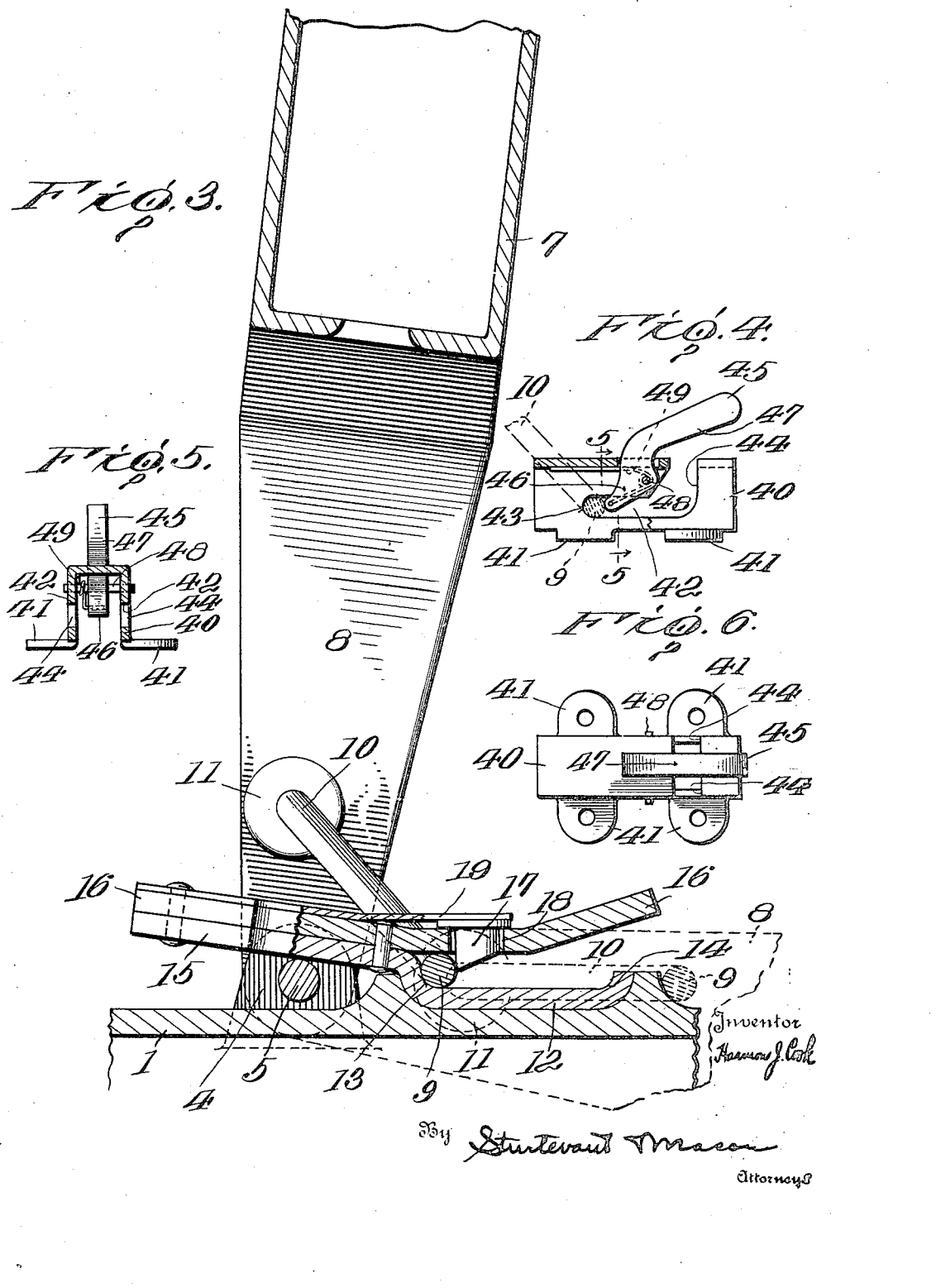

Patented Apr. 17, 1923.

1,452,192

UNITED STATES PATENT OFFICE.

HARMON J. COOK, OF TORRINGTON, CONNECTICUT, ASSIGNOR TO THE TORRINGTON COMPANY, OF TORRINGTON, CONNECTICUT, A CORPORATION OF CONNECTICUT.

HANDLE-ADJUSTING MECHANISM.

Application filed February 21, 1922. Serial No. 538,333.

*To all whom it may concern:*

Be it known that I, HARMON J. COOK, a citizen of the United States, residing at Torrington, in the county of Litchfield, State of Connecticut, have invented certain new and useful Improvements in Handle-Adjusting Mechanisms, of which the following is a description, reference being had to the accompanying drawing and to the figures of reference marked thereon.

My invention relates to handle attaching means for vacuum cleaners and the like.

The object of the invention is to provide means adjacent the pivotal point of the handle whereby it may be held in a vertical position when the machine is not in use, then by pressing the handle downwardly, it may be released for its normal action in moving the machine about and tilting it when necessary, and finally the handle may be swung down to a nearly horizontal position when the machine is to be pushed under articles of furniture or the like.

This object I accomplish by the construction shown in the accompanying drawing, in which—

Figure 1 is a side elevation of a vacuum cleaner provided with my improved handle attaching means shown partly in section;

Fig. 2 is a detail plan view partly in section, and

Fig. 3 is an enlarged sectional side elevation;

Fig. 4 is a sectional side elevation of a different form of the guide plate and latch;

Fig. 5 is a transverse section on line 5—5 of Fig. 4; and

Fig. 6 is a plan thereof.

The machine 1 to be propelled is shown as a vacuum cleaner, provided with front ground wheels 2 and a rear wheel 3. The top of the casing or body of the machine 1 is provided with a pair of apertured ears 4, 4 connected by a removable headed bolt 5, having a nut 6 on its threaded end. Upon the bolt 5, is mounted the handle carrying socket 7, by means of forked ends or arms 8, 8 which pivot loosely on the said bolt. Within the fork 8 is hung a loose brace in the form of a link 9 of substantially U-shape with trunnions 10 at right angles to the upper ends of its two arms; these trunnions or pivots 10 being mounted in transverse apertures or bearings 11, in the fork arms 8.

The top of the machine 1 in rear of bolt 5 and below the loose brace or link 9, is provided with a guide plate 12, having upturned ends forming shoulders 13, 14. The cross bar of link 9 rides along the upper face of this guide plate 12 as the handle is raised and lowered, and the shoulders 13 and 14 limit the movement of the link. The front end of guide 12 is continued forwardly and upwardly as an inclined extension 15 to which is secured a guard plate 16 which extends rearwardly over the guide 12; the rear end of the guard 16 being extended at an incline over and beyond the rear shoulder 14 of guide 12 so as to direct the cross bar or lower end of brace or link 9 back into the guide 12.

In order to lock the brace or link 9 against the forward shoulder 13, a latch 17 is provided. This latch 17 projects down through an aperture 18 in guard plate 16 with its lower end inclined rearwardly and upwardly so that the cross bar of the link 9 may readily snap under it when moved forwardly along the guide 12. The latch 17 is prevented from turning in aperture 18 in any suitable manner as by slabbing or flattening one side of the latch and the adjacent side of the aperture. The latch 17 is pressed down by a spring of any suitable kind, a plate spring 19 being shown.

The guide plate 12 is held to the article to which the handle is applied by means of screws 20 passed through apertured ears 21 formed in the plate.

The operation is as follows:—

When it is desired to set the machine aside after using it, the handle will be swung up to a vertical position and in so doing, the link 9 will hang down with its cross bar moving forwardly along the guide 12 until it raises the latch 17 and is stopped by the forward shoulder 13. The latch 17 will now have snapped behind the link and so will hold it and the handle against return movement. If, however, it be desired to use the machine, the handle will be pressed rearwardly and latch 17 will yield to this pressure and the brace or link 9 will ride rearwardly along the guide 12. This is the position of the brace or link 9 when the handle is in its normal inclined operative position. Should it now be desired to lift the front end of the machine to pass an obstruction such as a door sill, edge of a rug, etc., it will simply be necessary to press the handle downwardly until the brace or link 9 engages the rear shoulder 14 of guide 12 which shoulder then forms the fulcrum point.

When it is desired to lower the handle to a substantially horizontal position, to permit the machine to be pushed under articles of furniture, for instance, the brace or link 9 will be swung rearwardly out of guide 12 and past the rear end of the guard and so the handle not having any support will drop down. By now raising the handle, the brace or link 9 will pass under the rear free end of the guard 16 and so be directed back into the guide 12, its normal operative position.

Referring to Figs. 4, 5 and 6, the guide is formed of a box-like body 40, open at its lower side and provided at the lower edges of its side members with attaching ears 41. The sides of the body 40 are provided with slots 42, the front closed ends of which form stop shoulders 43 for the forward travel of the link 10. From this point the slots 42 extend rearwardly and horizontally and thence upwardly through the top of the body 40. Rear stop shoulders 44 are formed at the points where the slots 42 curve upwardly and these stop shoulders 43—44 correspond in function to the shoulders 13—14 in Figs. 1, 2 and 3.

In Figs. 4, 5 and 6 there is provided a combined latch and guard 45 in lieu of the two part latch and guard 17—16 of Figs. 1, 2 and 3. This latch and guard 45 comprises a latch member 46 pivoted at its rear end in the body, as shown at 48, so that it projects down below the plane of the slots 42 and so lies in the path of the cross bar 9 of link 10, which cross bar will lift the latch member 46 in the forward movement towards shoulders 43 and then the latch will snap downwardly and hold the link to the shoulders until sufficient pressure is applied to lift the latch as described with relation to the latch 17 in the first three figures. The latch member is extended rearwardly and upwardly over the top of the body 40 and above and across the open end of the slots 42 so as to form a guard 47 which functions like the guard 16 in the first three figures. This guard and latch is held in its operative position by means of a spring 49 coiled about the pivot pin 48 with one end engaging the latch portion 46 and the other end bearing on the under side of the top of the body 40. This construction simplifies that of Figs. 1, 2 and 3 as there are fewer parts and these are more readily assembled.

It will be seen, therefore, that I have provided a handle connection which is simple in construction and capable of highly useful functions.

While shown as applied to a vacuum cleaner, it is obvious that the handle mechanism may be applied to other hand-propelled tools or machines.

Having thus described the invention, what I claim as new and desire to secure by Letters-Patent, is—

1. The combination with a machine having a vertically swinging handle provided above its pivotal point with a depending swinging brace or link; of a guide below the link and along which the cross bar of the link slides, a shoulder or stop for the link at the forward end of the guide, and means for retaining the link against said stop.

2. The combination with a machine having a vertically swinging handle provided above its pivot with a depending swinging brace or link; of a guide below the link and along which the lower end or cross bar of the link slides or travels, shoulders at opposite ends of the guide for engagement by the said lower end of the brace or link as the handle is raised or lowered, and a yielding latching means adjacent to the forward shoulder to hold the link or brace and the handle in raised position, the link being adapted to be lifted out of engagement with the rear shoulder when the handle is to be lowered to a substantially horizontal position.

3. The combination with a machine having a vertically swinging handle provided with a depending swinging link or brace; of a guide way, in which the lower free end of the brace or link works, shoulders at the ends of the guide way to limit the travel of the brace or link, a latching means to engage and hold the brace or link to the forward shoulder, and a guard plate over the guide way and having a rearward extension to guide the brace or link back into the guide way.

4. The combination with a swinging handle member having a forked attaching end, and a depending link or brace pivoted at its upper end to said forked end; of a guide for the lower end of the brace or link having stop shoulders at its ends to limit the movement of the link or brace, a catch adjacent to the forward shoulder to lock the brace or link against said forward shoulder, and a guard plate overlying the guide with its rear end spaced from and projecting beyond the rear shoulder.

5. The combination with a swinging handle member having a forked pivotal end and a depending U-shaped brace or link pivoted at its upper end to the said forked end above the pivotal point thereof, a longitudinal guide way for the lower cross bar of the brace or link provided at its ends with stops or shoulders to limit the movement of the link along the guide way, and retaining means adjacent to the forward shoulder or stop to retain the link against said shoulder, and means over the guide to guide the link back into the guide way at the rear end thereof.

6. The combination with a machine having a vertically swinging handle provided with a depending swinging link or brace, of a guide-way in which the lower free end of the brace or link works, shoulders at the end of the guide-way to limit the travel of the brace or link, a combined spring actuated latch and guard pivoted to the guideway with its forward latch portion projecting into the path of the link or brace, and its guard portion extending rearwardly to guide the brace or link back into the guideway.

7. In a handle adjusting mechanism, a boxlike guide having attaching means for connecting it with a machine, and provided with horizontal slots in its sides extending rearwardly and upwardly through the top of the body, and a combined latch and guard pivoted at the forward latch forming end in the boxlike guide above the slots with its nose projecting downwardly and intersecting the slots and its rear guard forming end extending rearwardly and upwardly across the open ends of the slots, and a link or brace adapted for connection with a machine handle and to travel in said slots for the purposes described.

In testimony whereof, I affix my signature.

HARMON J. COOK.